(12) United States Patent
Saigh et al.

(10) Patent No.: US 10,825,090 B2
(45) Date of Patent: Nov. 3, 2020

(54) RARITY TRADING LEGACY PROTECTION AND DIGITAL CONVERGENCE PLATFORM

(71) Applicants: Michael M. Saigh, Clayton, MO (US); Xiaohong Zhang, St. Louis, MO (US)

(72) Inventors: Michael M. Saigh, Clayton, MO (US); Xiaohong Zhang, St. Louis, MO (US)

(73) Assignee: Liquid Rarity Exchange, LLC, Clayton, MO (US)

( * ) Notice: Subject to any disclaimer, the term of this patent is extended or adjusted under 35 U.S.C. 154(b) by 1060 days.

(21) Appl. No.: 15/072,911

(22) Filed: Mar. 17, 2016

(65) Prior Publication Data
US 2017/0178236 A1    Jun. 22, 2017

Related U.S. Application Data

(60) Provisional application No. 62/268,281, filed on Dec. 16, 2015.

(51) Int. Cl.
*G06Q 40/04* (2012.01)
(52) U.S. Cl.
CPC .................. *G06Q 40/04* (2013.01)
(58) Field of Classification Search
CPC .................................................. G06Q 40/04
USPC ........................................................ 705/37
See application file for complete search history.

(56) References Cited

U.S. PATENT DOCUMENTS

| | | | |
|---|---|---|---|
| 7,415,471 B1 | 8/2008 | Coleman | |
| 8,015,069 B2* | 9/2011 | Saigh | G06Q 30/0601 705/26.1 |
| 9,588,651 B1* | 3/2017 | Buchanan | G06T 15/00 |
| 2005/0144061 A1 | 6/2005 | Rarity et al. | |
| 2008/0297535 A1* | 12/2008 | Reinig | G02B 27/2235 345/633 |
| 2009/0187512 A1 | 7/2009 | Giroux et al. | |
| 2010/0138360 A1 | 6/2010 | Cutler et al. | |
| 2010/0235270 A1 | 9/2010 | Baker | |
| 2011/0022494 A1 | 1/2011 | Lutnick et al. | |
| 2011/0246212 A1 | 10/2011 | Barnes | |
| 2017/0178236 A1 | 6/2017 | Saigh et al. | |

OTHER PUBLICATIONS

Written Opinion from corresponding International Application No. PCT/US2017/22520 dated Jul. 7, 2017.
International Search Report from corresponding International Application No. PCT/US2017/22520 dated Jul. 7, 2017.

* cited by examiner

*Primary Examiner* — Robert R Niquette
*Assistant Examiner* — Liz P Nguyen
(74) *Attorney, Agent, or Firm* — Sandberg Phoenix & von Gontard P.C.

(57) ABSTRACT

A trading platform network for rarities is provided. The network includes at least one raritymine, an online merchandising convergence, and input from a robo-rarity trading data stream. According to this aspect, rarityminers are enabled to view virtual three-dimensional depictions of rarity assets contained in the at least one raritymine and buy and sell raritybits. A rarities trading exchange toolkit which includes the trading platform network and a rarity system is also provided.

16 Claims, 10 Drawing Sheets

FIG. 1 100 Rarity Trading Platform Network

600 Rarity Trading Platform Privacy Option

FIG.7 Mobile Rarity Trading Platform
700

800

900
Convergence (OMC)
My Space, My Rarities
Fine art example

1000

RARITY TRADING LEGACY PROTECTION AND DIGITAL CONVERGENCE PLATFORM

CROSS-REFERENCE TO RELATED APPLICATIONS

This application claims priority to U.S. provisional application No. 62/268,281, filed on Dec. 16, 2015, which is incorporated herein by reference as though fully set forth herein.

STATEMENT REGARDING FEDERALLY SPONSORED RESEARCH OR DEVELOPMENT

Not applicable.

BACKGROUND

This application relates in general to improved trading systems for rarities, and in particular, to the establishment of a trading platform network for rarities with raritymine, online merchandizing convergence and robo-rarity trading components and/or capabilities.

Presently, peer-to-peer (P2P) networking interest and social media have attracted investments overlapping a common core of interest, experience and origination we now call crowd funding. Crowd funding and ecommerce have dramatically increased due, in part, to the increased speed of information received by Internet users and to the reality of tight money for non-credited investors and small and micro-entities.

Furthermore, friend-to-friend (or F2F) computer networks, types of peer-to-peer networks in which users only make direct connections with people they know, are also gaining interest. Passwords or digital signatures can be used for authentication. Unlike other kinds of private P2P networks, users in a friend-to-friend network typically cannot find out who else is participating beyond their own circle of friends, so F2F networks can grow in size without compromising their users' anonymity. RetroShare, WASTE, GNUnet, Freenet and OneSwarm are examples of software that can be used to build F2F networks, though RetroShare is the only one of these configured for friend-to-friend operation by default.

The discrepancy between the middle class and small investors verses wealthy, qualified investors has generated a fundamentally unbalanced opportunity for the less financially fortunate.

Rarities are largely non-correlated to the financial marketplace. However, investments in high value rarities are generally financially out of reach for the great majority of individuals due to the high prices of these assets.

The middle class has been largely excluded from the realm of rarity investments—thus, they are not provided the financial buffer available to higher income investors through rarity investments; nor are they granted use of rarities as a means of diversification; or applying rarity investments as a defensive position; and such. In addition, rarity investments, if available, could help protect the small investor from market volatility and inflation.

As detailed in the below description, the present invention's architectural design and investment platform empowers the small investor and opens up the rarities as an investment in the form of fractional shares. Furthermore, "high net worth investors" (HNWIs) are not the only parties knowledgeable about fine art, stamps, coins, cars and other rarity assets. For example, "Mike," an automobile mechanic, possesses far more knowledge of classic automobiles than almost all non-mechanics, but cannot afford to purchase a classic automobile valued at $150,000 USD or more. Taking the same example from an investment point of view, Mike, the mechanic specializes in repairing and refurbishing Aston Martins; however, he could never afford to purchase the car because of its high price. Mike's knowledge of this British sports car is far more than that of his patrons. When Mike watched a 1957 Aston Martin DB3 2/4, Mark III be sold for $350,000 USD, even though he couldn't afford to purchase the automobile, he knew that the car was undervalued, given its high grade, if a few preservation procedures were implemented. Mike also had a large list of patrons who, in this example, used his expertise to resell the car for $425,000 USD while costing only $5,000 for repairs, thus providing a profit of $70,000. However, his financial ability for borrowing the needed sum from a bank or financing it through his savings, is financially out of his reach.

The previous example represents a commonplace situation in the world of high value rarities. The means whereby Mike, the mechanic, or, for instance, a middle class family possessing a great deal of knowledge regarding a rarity(ies) which relates to their avocation, vocation or aptitude, are currently not available to be utilized. In addition, as described in the previous example, this is not purely the result of a lack of capital when investing in rarities, but rather, a current systemic lack of a structural design and platform which can open rarity assets to millions of knowledgeable investors like Mike, increases their liquidity and helps diversify large or small investment portfolios.

Rarities, such as valuable tangible assets, can be defined, e.g., as coins, gems, fine art, rare vehicles, antiquities, antiques, time pieces, musical instruments, precision instruments, historical designs, architectural renderings and structures, and special collections, sports and entertainment memorabilia, athletic contracts, equine related sports i.e. racehorse fractional share ownership, robotic entertainments, rare books, rare documents, autographs, fine wines and spirits, recovered treasures and other man/woman-made rarities, environmental geological and archeological rarities, historical artifacts, documents and all other tangible and intangible assets (copyright, brands, trademarks etc.) for all privatized or public ownership and possession that have an identifiable value due to their rareness, scarcity or similar unique or special quality. Rarities can be generated by a single creator where his or her name is recognized by their talent, e.g., Picasso, or through one or more creator groups, e.g., ones who design, assemble and sell classic automobiles, e.g., Moon Motor Cars produced in St. Louis, Mo., and founded by carriage maker Joseph W. Moon. In this example, the engine was designed by George Heising and Louis Mooers. In other words, rarities can have more than one tangential creator when creating the lasting value, or they could be a one of a kind.

In addition, rarity investments can also include intangible assets exemplified by copyrights, patents, software, trademarks and branding, etc., that fit within the rubric of a "rarity" as outlined herein. Presently intangible rarity assets greatly help increase an organization's value. Thus, rarity investments can come in the form of any security vehicle or any non-securitized ownership unit.

The current world of rarity investments faces significant issues. Presently, billions of dollars (USD) of rarity assets annually are fraudulently traded. Many fraudulent trades are made through irreparable dealer forgeries, sophisticated copies are transacted, damaged rarity assets are too often sold and, in certain circumstances, items are purchased and money exchanged, but the rarity asset is simply not delivered.

Some security measures do currently exist. eBay™, Amazon.com® and other online traders provide buyer and seller reviews between the buyers and sellers. Secure payment processes may be available for such transactions as through PayPal®, Bitcoin®, Blockchain Clearing House™, and other methods of payment. However, little security is provided for higher value rarity tangible assets (Rarities). Moreover, as discussed below, an effective system for handling the multitude of requirements of tangible rarities assets, if they were to be sold in fractional shares, has not previously been considered. Furthermore, an effective computer processing platform that can accommodate the needs and peculiar aspects of rarities and their trading, of the type described herein, is not believed to exist.

Presently, the high cost of tangible rarity assets makes them unaffordable for almost 98% percent of the American public (and even more so internationally), outside high-net worth individuals (HNWI). Thus, the middle class is locked-out of the opportunity to diversify their investment portfolio as an investment strategy and market buffer.

In addition, even institutional rarity investors are limited to an antiquated system of broker/dealership relationships with HNWI's and auction houses, which are subject to reserve pricing for rarities which also exceeds the financial ability of approximately 98% of the populous.

SUMMARY OF THE INVENTION

Accordingly, in one aspect of the invention, a trading platform network for rarities is provided. The network includes at least one raritymine, an online merchandising convergence, and input from a robo-rarity trading data stream. According to this aspect, rarityminers are enabled to view virtual three-dimensional depictions of rarity assets contained in the at least one raritymine and buy and sell raritybits.

In another aspect of the invention, an Online Merchandising Convergence (OMC) is established. The OMC includes a virtual merchandising mart wherein a virtual three-dimensional depiction of one or more rarity assets included in a raritymine is configured for visualization by sellers and buyers of raritybits in the raritymine.

In yet an additional aspect, the invention establishes a robo-rarity trading support (RRTS) system. The system includes a smart data compiler configured to provide input information for use by a rarityminer to evaluate rarity assets or rarity asset pools in a raritymine.

In still a further aspect, a rarities trading exchange toolkit is provided. The toolkit includes a trading platform network for rarities and a rarity system.

In addition, other properties unique to rarities when used in commodity trading hereby described by the present invention do not exist throughout the trading cycle. The RTP System secures rarity asset protection, enhances peer-to-peer rarity vetting, transparency, compliance and Rarity Operational Trading Rules (ROTR) in order to minimize error and fraud.

Thus, the described embodiments provide systems and methods for any type, usage and classification of a dynamic Rarity Trading Platform (RTP) network and developers' tool kits therefore, where the full or fractional ownership of a plurality of rarities can be exchanged. Rarities handling and trading (both involving tangible and intangible asset forms) require distinctive implementation strategies when traded in fractional shares. Rarities are generally irreplaceable and thus the described invention provides for unique exchange software, physical tracking and safety mechanisms, unique digital transactional communication and controls, navigation and other operational guidelines which provide for a robust rarity trading exchange. The RTP network of the invention, in certain aspects, includes; the fractional trading of RarityBits (RB) traded as a single or pool of assets referred to as a RarityMine (RM), rarity asset offerings, financial analysis data streams, rarity logistics, specialty asset nodules, Raresearcher, RoboRarity-Trading (RRT), and related features. In addition, buyers-sellers convergences, referred to herein as the invention's Online Merchandising Convergence (OMC), is the virtual trading mechanism providing 3-dimenisional visualizations of rarities in appropriately coordinated interfaces linking online peer-to-peer buyers and sellers; RarityMiners (RMS), analytics, certification and authentication, cryptography, and related features as described herein below. The RTP seller-buyer trading platform and software developers' tool-kit includes methods and technologies which encourage rarity trading transparency, legacy process, liquidity and fairness and legality as herein referenced.

BRIEF DESCRIPTION OF THE DRAWINGS

The presently disclosed subject matter will be better understood from reading the description of non-limiting embodiments, with reference to the attached drawings, wherein below.

DETAILED DESCRIPTION OF THE INVENTION

Figure 1:
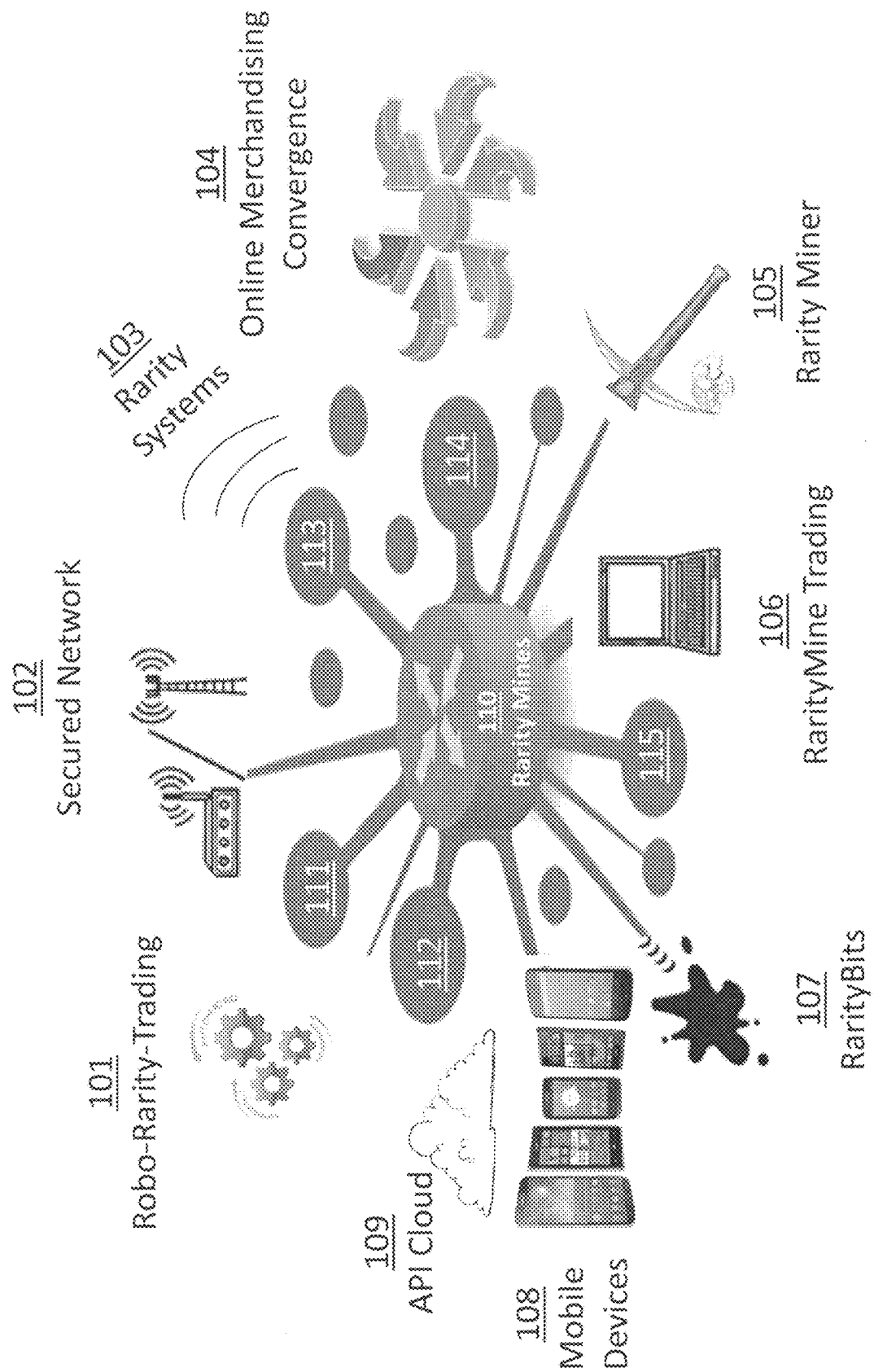
FIG. 1 is a schematic depiction of a secure Rarity Trading Platform communication wireless, wired or land network, which can transfer rarity information and transactions on an Internet web-based Transmission Control Protocol/Internet Protocol (TCP/IP) in accordance with an embodiment of the present invention.

In various aspects, the systems, methods and components of the invention provide the ability to open the rarities market through fractional shares and other means such as the Online Merchandising Convergence, described below, to a greater marketplace of investors, eliminate fraud and unfair dealing through greater transparency and increased disclosure of useful rarity information, and create secondary markets through a multifaceted dynamic rarity buy-sell system, which thus motivates it to become an important defensive investment strategy for the public, especially average income investors typically excluded from meaningful participation in rarities markets.

The following definitions and instructions are provided to assist in the understanding of the terms and components included in the embodiments of the invention.

The Rarity Trading Platform (RTP) is defined as a developers' network, or tool kit therefore, for rarity asset owners which is configured to provide for buying and selling of fractional shares in rarity assets. The RTP can be configured to include one or more of communication link(s) for rarity asset(s), information associated with each rarity asset, registration process, trading engine, cryptography, valuation, payment process, title ownership exchange, mobile platforms, open platform, Application Programming Interface ("Cloud") or ("API") notification, analytics and diagnostics, valuation and trading alerts and all required legacy aspects. The RTP software secure stores items including one or more of, legacy information, ledger information, certification, rarity vetting, logistics, insuring, clearing, storage, safety and all needed Rarity Operational Trading Rules (ROTR) and technology required to establish a robust rarity exchange system. The RTP could be implemented in conjunction with one or more; entities, trades, transactions, open or closed exchanges, RarityMining organization(s), RarityMiner, RarityMiners, RarityMines, RoboRarity-Trading, Rare-Searchers, RaritySystems, geographic location(s) and rules, and related items.

A "legacy" is defined as the full or fractional ownership and title of one or more rarity assets stored at one or more locations and tracked and protected throughout the trading process.

Raritymine (RM) is defined as a rarity asset, pool of rarity assets, or a rarity classification of assets such as those up for sale, or previously up for sale, and traded on an RTP network.

Raritymining (RMG) is defined as an act of listing, registration and providing information required to trade an asset, one or more assets or a pool of assets to be sold on an RTP.

Rarityminer (RMR) is defined as a rarity buyer or potential buyer of one or more rarity assets or pool of assets. RMR will utilize the services, information, analytics, and related products and services that are offered through the RTP system, as well as, in certain embodiments, provide their own expertise and information when investing in rarity assets or participating in the RTP network. Thus, a RMR can provide an important security layer by adding yet another protective sheath during and supplemental to the transaction process which becomes available to minimize fraud, search for seller misconduct, heighten informative research regarding an individual rarity asset or group, classification, pool, or subset of rarity assets. A RMR can also provide expertise through his or her own rarity passion and collection skills.

Rarityminers (RMS) are defined by secondary markets as rarity asset investors who purchase RarityBits (RB). Rarityminers, in one embodiment, are peer-to-peer (P2investors who accept a fractional ownership in an asset owned by the RM for a certain price.

RarityBits (RB) are defined as ownership units for rarity assets. These units can be in the form of stocks, bonds, percentages, or any other appropriate unit of ownership. RBs sold through a RM are not market makers nor, under existing standards, have to register themselves as a broker-dealer, since they own the asset and are using the open RTP to sell their fractional shares to one or more RMS. A RMS, after proof of ownership, could become a RM and sell the shares to his or her RMS. A similar model can be used indefinitely, unless the asset itself is approved for sale by the majority owners, e.g., as established by applicable Rarity Operational Trading Rules (ROTR).

RBs can be managed, e.g., in an RTP system, and bought and sold in fractional shares over a set period of asset holding time. These managed RBs can be self-managed. They can be, respectively, sold by subsequent owners over a period of time. Furth, whether managed or self-managed, such RBs can be bought and sold as whole assets over a set period of asset holding time, or bought and sold as whole assets and subsequently sold by subsequent owners over a period of time.

Rarity Operational Trading Rules (ROTR) is defined as the rules and ownership legacies attached to the RTP rarity assets. In various embodiments, these can include, but are not limited to, any trading rules, requirements, conditions, special circumstances and situations, pricing, special situations, positions, fulfillment, transparency, penalties, trading vehicle, insurance requirements, storage, security, privacy and other rules and ownership legacies attached to the asset(s), governs a rarity asset, rarity assets or a pool of rarity assets. Legacies such as taxes, liens, debt, and other disclosures necessary to establish fair trade and asset values in embodiments herein, are designed to be transparent under a self-governing pledge and agreement by all RM, RMS, and operational data providers as such relates to the RTP system and ledger.

Raritysystem (RS) is the neutral handling organization which links the physical rarity asset from seller-to-buyer or buyer-to-seller. In addition, RS could be referred to as the rarity gatekeeper which, in certain embodiments, does one or more of, authenticates, certifies, inspects, tags, tracks, logs data, securely communicates, logistically streamlines buyer-seller transactions, forensically measures, permeates smart particles and materials, enters secure data points and data sets required to protect, secure and store the physical asset. RS can include any and all physical data, all (e.g., visual and audible) frequencies, environmental safety, cargo, handling and other physical requirements.

Roborarity Trading (RRT) is defined as a smart system which collects trading data, analytics and guidelines to determine rarity asset or rarity pool evaluations in order to maximize the returns for the RTP system customers, partners, affiliates, sellers and buyers of rarity assets. In addition, RRT provides rarity investment building blocks for forecasting trends, values, indexes, historical analysis, fundamental analysis, advanced search and browsing mechanisms and software to help RM and RMS to lower risk, maximize reward and invest in rarities which are best suited to their interests, knowledge base and investment strategies.

Raresearcher (RSR) is defined as a person, persons or expert entity in any region or locale who possesses special expertise, knowhow and/or experience in particular rarities (as exemplified by Mike, the mechanic in the above example). An RSR can help bring in that knowledge possessed by Average Net Worth Investors (ANWI)—unqualified investors, and High Net Worth Investors (HNWI)—qualified investors.

Online Merchandising Convergence (OMC) is defined, in appropriate contexts used herein, as the advent of a rarity asset SKU interactively listed on the RTP system in a virtual 3D format. In addition, an OMC, in appropriate contexts used herein, can be used to exchange; images and trading information in harmony and in sync to the previously described RM, RMG, RMR, RMS, RB, RS, RRT, RTP, ROTR as it relates to an RTP network and the general sale of online merchandise.

According to an embodiment of the invention, a RM is set up on a rarity Internet campus, one global in scope, where rarity owners can secure their own Internet showcase wall space (e.g., a wall slot) or vestibule. For example, a gallery can reserve "wall space" to virtually showcase their fine art, a classic car dealer or collector could reserve one or more virtual "garage spaces", a coin or stamp broker or auction house could reserve showcase space to sell whole or fractional shares of their assets. Thus, in general, according to the invention, vetted rarities for all classifications and sub-classifications can be showcased in such a virtual, 3-dimensional manner.

Furthermore, a virtual slot in an RM can, in similar fashion to real wall space and overhead, be rented out. The OMC system, in various embodiments, could distinguish particular virtual spaces, e.g., to optimize buyer-seller traffic, scale, type of asset, rarity value, rarity size, asset popularity and demand, information complexity, historical references, search engine(s), number of fractional share buyers, analytics, and a multitude of other factors.

In addition, in another aspect of the present invention, the OMC System's software enables sellers and buyers to dynamically link and customize both virtual environments in three dimensions, or, e.g., holographically. Sellers can, e.g., log in, register and list their assets in the OMC virtual space. The OMC virtual wall space, in this embodiment, can include a plurality of shades, colors, rooms, decorations, structures, signage, virtual directions and guides, and virtual building tools which are unique to the organization or individual. In like fashion, the OMC System's software would enable buyers, when owning a fractional share of a classic automobile to virtually customize their own garage to house the virtual transaction.

The present invention can be provided as a computer program product where RM or RMS, e.g., registers as an agent of the RTP and facilitates the sale of their own asset(s). A RM or RMS can utilize the RTP network system to help facilitate their own transactions and act as their own market maker or broker-dealer. In addition, in yet another embodiment the RTP could utilize a market maker that accepts the risk of holding a certain number of shares of a particular security. Further, any traditional securities exchange or broker-dealer network could correspondingly implement the RTP network system of the invention in order to facilitate bids and asks from one or more buyer or seller. The RTP network system could also include a plurality of individual asset holders and asset buyers, institutional asset holders and asset buyers, non-qualified investors, qualified investors, the Securities and Exchange Commission (SEC) or its international equivalent registration, or unregistered rarity assets or pool of assets. In other words, the RTP network system is flexible and can be adjusted to accommodate differences between rarities, scale, markets, personal incomes, regulations, liquidity, rarity safety, storage and global demand.

For example, one transactional portfolio could include Rarityminers registering their ID, billing account, required fields and other useful information through the RTP System. A Rarityminer, after registering in the RTP system, e.g., could purchase RarityBits and complete the transaction with a rarity seller.

Similarly, in another application, institutional investors and broker-dealers could also utilize the RTP systems model as qualified investors on a larger scale.

The present invention, in one embodiment, includes an internal processor which securely disseminates all forms of rarity data for one or more forms of rarities, one or more ownership entities and all information, certifications, evaluations, appraisals, locations, historical information, fundamental information and enriched information required to protect individual retail investors and commercial entities or organizations.

RTP, e.g., can include one or more management network(s), P2P comments and evaluations, real-time pricing data and forecasting as potentially required by any federal, state, county and local government(s).

In another embodiment, the RM or RMS could become a registered agent of the RTP to facilitate the sale of their own asset(s). It is understood by anyone familiar with the art that RM is not a market maker, nor a broker-dealer firm that accepts the risk of holding a certain number of shares of a particular security. RMS facilitates the risk of shares they own and thus, if registered in the RTP system, facilitate their held RarityBit(s) trades to potential RMS buyers.

The present disclosure also relates to a smart, dynamic database, data streaming processor and trading platform which interfaces with and is designed for the unique physical properties of rarities sold to a plurality of investors. It is incongruous for a rarity asset such as a painting, when sold to a plurality of investors, to be capable of simultaneously displaying and storing the physical painting in more than one location. Among the RTP exchange's purposes is to maximize investments for not only HNWIs, but for common investors who have been locked out of the market due to the high cost of the tangible or intangible rarity asset class. Thus, rarity fractionalization investments, e.g., can include a plurality of investors on a public or private exchange.

In an embodiment of the present invention, an RTP can be established, e.g., as self-managed by a funds security manager, since its investment decision is based on P2P expertise and telecommunication technologies which link both buyers and sellers of the asset(s).

The actual RTP investment mechanism can vary from investor to investor, but could allow fractional ownership exchanges from buyers and seller in many different iterations. For example:

Fractional shares being bought or sold in a single rarity asset. A rarity classification or sub-classification could become a singular rarity investment. One example is the owner of a single Stradivarius owned by 1001 fractional owners.

Shares, percentages, units etc., could be defined interchangeably when quantifying value and the number of entities owning the rarity asset.

Fractional shares being traded in one specific rarity sub-classification, for example, multiple Stradivarius violins being traded.

Fractional shares being traded in one rarity music classification, for example, all fine string instruments including Stradivarius violins.

Fractional shares being traded in a plurality of all musical instruments in the musical classification; for example, string instruments, brass instruments, percussion instruments.

Fractional shares being traded in a plurality, one or more classifications or sub-classifications for all rarity assets in order to diversify.

In addition, in yet another embodiment, buyers and sellers can converge when trading assets. This could again be structured in many reiterations as exemplified by the following:

1. Self-managed asset trading where buyers and sellers exchange fractional shares or whole shares. The exchange process will be software driven through a developer's tool kit. However, the transactions and investment decisions will be managed by the traders, not by a 3rd party. This bifurcation will enhance the free market system and allow small entities to prosper from their own knowhow. It is understood by someone familiar with rarities that rarities are unique assets. Rarity investors are also often seen in a non-investment connotation referred to as "passion investors". These investors typically have more knowledge of their investment interest than many financial managers. Thus, they could make better decisions regarding provenance in one or more rarity asset classes than such 3rd party financial managers. Investments in RarityBits by passion investors can thus save third party transactional fees, have a deep understanding of the marketplace and also save very expensive managerial fees. In addition, to saving management fees, Rarityminers buying in fractional shares, build an informed community of rarity assets and take ownership.

2. Managed rarity assets can be considered as another group of securities that have similar but distinct financial characteristics, behave for the most part dissimilarly in the marketplace, and, if managed, are generally subject to the same laws and regulations. The three main asset classes are equities (stocks), fixed-income (bonds) and cash equivalents (money market instruments).

Rarity assets could be both managed or self-managed under the Rarity Trading Platform (governing or self-governing) system. Trading geography, taxation, customs, market demand, regulation, rarity protection, operational costs (exchange, transportation, insurance, broker-dealer, buy-sell commission, etc.), e.g., can interplay with the degree of management or self-regulation in accordance with the rarity and trading process.

In addition, one of the primary embodiments of the invention includes Raritysystems, which, in brief, is a third party rarity warehouse, certification technology, and/or provenance technology to store, transport and link buyers and sellers of rarity assets when sold in fractional shares.

Rarities, when tangible assets, have an actual physical presence and thus, when owned by a plurality of investors, preferably are safeguarded by a third party. The Rarity Trading Platform (RTP) can include Raritysystem technologies which protect and preserve rarity assets through the use of advanced security technologies. Raritysystem can be configured as a sister company to the present RTP invention, serving, e.g., to provide the protection, tagging and data entry for valuable assets, including their transportation and storage.

More particularly described, unless contractually agreed upon otherwise, fractionally owned rarities should preferably be physically inspected by a nonaligned and neutral organization to certify, authenticate, distribute and redistribute, tag, log and manage rarity ownership trades. RTF helps assure rarity trading transparency, trading fairness and physical safety and rarity preservation, per trade. Trading can include fractional share ownership of a rarity or the actual exchange of the physical asset. It is also understood that public rarity transactions might require physical inspection by a 3rd party organization when RarityMine owners lack a legacy. In addition, the RTP system can exchange trading funds from any secure, trusted payment process, whether, Bitcoin, PayPal®, direct deposit banks, cash, credit cards, debit or other payment methods. Tangible assets (rarities) have unique physical properties which require nonaligned dissemination, storage, insurance, ensurance of physical safety, logistics, cargo handling, location tracking, earmarking, forensics, certification, authentication, clear title ownership (traceable title lineage), ownership integrity, and a robust secure database for each asset, etc. The present invention adds many needed security layers for both buyers and sellers of the assets, several checks and balances and needed technologies specifically designed for the exchange of high value rarities.

In addition, as envisioned herein, rarities can become a new investment classification in addition to the three main asset classes (note that some investment professionals add real estate and commodities, and possibly other types of investments, to the asset class mix). Whatever the asset class lineup, each one is expected to reflect different risk and return investment characteristics. Rarity investments, similar to all investments, perform differently in any given market environment and conditions and should be viewed as another useful asset diversification.

Asset classes and asset class categories are often mixed together. In other words, describing large-cap stocks or short-term bonds asset classes is incorrect. These investment vehicles are asset class categories, and are used for diversification purposes.

Stocks—Also called equities, fixed income—Fixed income, or bond investments, generally pay a set rate of interest over a given period, then return the investor's principal.

Money market—Money market investments are relatively safe, liquid short-term investments; examples include: government issued securities, CDs, banker's acceptances, euros and commercial paper.

Guaranteed—Guaranteed assets with a fixed rate and backed by the claims-paying ability of the issuing insurer.

Any combination of rarities sold or bought in fractional shares, e.g., can be exemplified for any intangible or tangible asset. Furthermore, it is understood that the present invention includes singular transactions, multiple transactions, one rarity, more than one rarity, one sub-classification of rarities or multiple classifications of rarities, etc. Peers can make a portion of their resources, such as processing power, disk storage or network bandwidth, directly available to other network participants, without the need for central coordination by servers or stable hosts. Peers can be both suppliers and consumers of resources, in contrast to the traditional client-server model in which the consumption and supply of resources is divided. Emerging collaborative P2P systems are going beyond the era of peers doing similar things while sharing resources, and are looking for diverse peers that can bring in unique resources and capabilities to a virtual community, thereby empowering it to engage in greater tasks beyond those that can be accomplished by individual peers, yet that are beneficial to all the peers. For example, conversation threading is a feature used by many e-mail clients, bulletin boards, newsgroups, and Internet forums in which the software aids the user by visually grouping messages with their replies. These groups are called a conversation, topic thread, or simply a thread. A discussion forum, e-mail client or news client is said to have a "conversation view", "threaded topics" or a "threaded mode" if messages can be grouped in this manner.

Threads can be displayed in a variety of different ways. Early messaging systems (and most modern e-mail clients) will automatically include original message text in a reply, making each individual e-mail into its own copy of the entire thread. Software may also arrange threads of messages within lists, such as an e-mail inbox. These arrangements can be hierarchical, arranging messages close to their replies in a tree, or they can be linear, displaying all messages in chronological order regardless of reply relationships.

Many F2F networks support indirect anonymous or pseudonymous communication between users who do not know or trust one another. For example, a node in a F2F overlay can automatically forward a file (or a request for a file) anonymously between two friends, without telling either of them the other's name or IP address. These friends can in turn automatically forward the same file (or request) to their own friends, and so on.

In addition, fractional shares could be self-managed and solely determined by the investor or managed by the fund manager(s).

Furthermore, e.g., rarities can be sold in a plurality of methods such as, but limited to:

an exchange where traders both (buyers and sellers) can directly trade rarity ownership or partial ownership and title—the exchange can be via an online or mobile trading platform which trades self-managed or managed fractional shares in one or more rarity assets;

primary or secondary marketplaces:

through managed securities—through self-managed assets (subjected to rarity protection and self-compliances);

various indexes;

through any investment vehicle—one or more investment vehicles. A product used by investors with the intention of having positive returns. Investment vehicles can be low-risk, such as certificates of deposit (CDs) or bonds, or can carry a greater degree of risk such as with stocks, options and futures. Other types of investment vehicles include annuities, collectibles (art or coins, for example), mutual funds;

through any trading exchange; and, other methods.

In addition, registration of each buyer and seller, buyer and seller rules management, conduct, rarity vetting, certification, rule and limitations, percentage of ownership, ownership tile, title legacy, trading requirements, compliance, etc. could be specified by the exchange or governing body.

In another embodiment of the present invention, multiple rarity ownership can require one or more of: neutral storage, collective insurance costs, taxes, cost of transportation, exchange costs, rarity location tracking, tagging, forensics, database, server costs, security costs, and other costs which could be shared, or in some cases, earmarked to one or more particular entities.

One component of the present invention is the sharing of P2P information of a particular tangible or intangible rarity asset prior to a person's or entity's investment. This "Wikipedia"-type knowledgeable database for each rarity asset investment can greatly increase transparency.

In one embodiment, Rarity Operations (ROP) opens new channels of market communication, new antifraud technologies and greater liquidity for rarity investors, creators' DNA identification, new forecasting algorithms, security alert monitoring for each rarity, hi-definition algorithmic correlation for each rarity asset, such as micron pixel, colors, piston coated image, early environmental damage detection, theft detection, fraud prevention and asset preservation.

In addition, the creator's DNA or RNA could be protected when embedded into the rarity asset. For example, the creator's hair follicle could be encased in silica to help protect the DNA in order to preserve the DNA and inhibit its breakdown. An example of this could be the creator's silica-encased DNA being embedded in the fibers of an art canvas. In certain cases, more than one or several creators' DNA could be dispersed in micro particles throughout a rarity asset and located by the secure computer system and data processor used to identify the originality and authenticity of the rarity asset through these DNA codes and micro locations embedded under the surface or upon the surface of a rarity asset. Furthermore, one or more arithmetic elements could be used by an authorized examiner of the rarity asset(s). These could include, but not be limited to, certain color codes such as, for example, hexadecimal color red, color code # FF000, which is '255' red, '0' Green, and '0' blue. These color codes could also be used to change the searched color for any type of rarity asset. It is understood that all forensic, chemical and scientific etc. detail could be identified through this dynamic RTP system. Furthermore, combinations of identifiers, particle sizes, and particular materials can be sourced and inputted, encrypted and received, when authorized by the RTP system.

In yet another embodiment the computer could mathematically choose asynchronous or synchronous similarity or dissimilarity in various degrees. One example could be a certain clarity, certain matching colors or a particular contour. By generating these computerized micro-points an authorized rarity examiner could not only identify the rarity asset but identify rarity deterioration or alteration when comparing the rarity over a particular time.

It is also understood that in various embodiments of the present invention that one or more of any rarity forecast, interpretation of projected global demand, degree of correlations, inter-correlations or intra-correlations, risk analysis and analytics between all tangible and intangible rarity assets can be included in the RTP system, including in a robo-rarity trading data stream provided to participants making use of the present invention.

In yet another embodiment, other present invention peer to peer robotics or robot buyer/seller suggestions, diversification, fundamental analysis, historical analysis, conversions and any other analytics can be used for investment safety and rarity preservation.

In addition, in another embodiment of the present invention, RBs, when used in conjunction with an OMC, for example, can be sold to a RM. RBs can be showcased in virtual galleries, garages and similar venues displaying a plurality of rarity classifications, as previously described, such as in virtual computer trading exchange show rooms which will display, for example, computerized 3D visualizations, auditory tours and show rooms designed for any type or variety of rarity asset. In other words, the RTP platform, in certain embodiments, is configured to display, e.g., a virtual rare car trading garage containing rare vehicles where a RM could virtually learn the rarity tradable platform where one or more RMS can virtually view, browse, interact, and "stroll through" a gallery, tradeshow, museum, fair, garage, or any other buyer-seller setting to look over, e.g., gems and jewelry, coins, antiquities, antiques, time pieces, musical instruments, precision instruments, historical designs, architectural renderings and structures, special collections, sports and entertainment memorabilia, athletic contracts, equine related sports, robotic entertainments, rare books, rare documents, autographs, fine wines and spirits, recovered treasures and other man/woman-made rarities, environmental geological and archeological rarities, historical artifacts, documents and all other tangible assets for all privatized or public ownership and possession. In addition, investments could include intangible assets exemplified by copyrights, patents, software, trademarks and branding, etc.

In addition, it could be determined by one or more rarity investment groups, the exchange or the owner of the rarity asset to design the OMC system in such a way to lose the OMC virtual image and virtual rights when the fractional rarity owner sells his or her interest. For example, the image of a painting on the virtual living room when sold could either disappear, become opaque or translucent for example.

The 3D virtual model could also, in another embodiment of the present invention, be virtually driven and raced against other automobile, plane, motorcycles, horse or other rarity whether by natural or mechanical motion. Thus, action-oriented depictions and computer games could be generated through the RTP system, adding yet additional attributes of active ownership enjoyment. Similar "reality oriented" virtual showcases can include some combination of action (e.g., a ballet depiction of the Degas' "Little Dancer"), smell (rarity perfumes or other fragrances), taste (flavors from exquisite dishes of famous French chefs) or touch (the smooth chrome feel of a rarity antique Rolls), and/or sound (the roar of the engine of the antique Rolls or sounds of the above-mentioned auto race). Possibilities for expansion of sensory-realistic OMC venues will continue to expand as technology enables more life-like sensory experiences.

In yet another embodiment, Raritybit units could be standardized in the form of value for other online or tangible asset trades or exchanging process for goods and services. It is obvious to anyone familiar with the art that any financial valuation or monetary unit could be modified to the rarity asset and adapted for any type or form of equity, debt or financial vehicle.

Additionally, the present invention, as a potential RM sets about learning the rarity trading platform, can be made available and operated as a tutorial in a practice mode. In this mode, actual investments are not made, but practice buys and sells using the same operating steps and mechanisms are provided. In this practice mode, a participant, in certain embodiments, can also be provided instruction and tips on rarity investing. The practice mode and tutorial options permit the novice RM (or one entering a new area of rarity investing) to build their virtual residences, living rooms, garages, galleries, walls, vaults, home on a beach or other virtual spaces while developing the skills and experience to become actual investors. Thus, the practice mode allows one to develop necessary skills and familiarity with available investment tools while, e.g., simultaneously visualizing what virtual Porsche should go in what garage, and how it looks and "fits", both virtually, and as a part of his or her investment portfolio. The practice mode can further allow for computation of an actual rarities investment track record and assessment of investment acumen, as one's investment choices, rarity portfolio's history and return on investment (ROI) for each fractional asset can be computed and compared, if desired, with other practice mode, and even actual, investors.

Online Merchandise Convergence (OMC), in one embodiment of the present invention, provides an interactive trading mart which integrates the RM rarity assets previously owned by asset holders and RarityMiners as also previously described in one embodiment of the present invention.

An OMC enables a trading forum between the owners of the rarities and the potential buyers of the rarities. The owners' virtual OMC campus, e.g., can be comprised of one or more 3D depictions of rarity assets. All online rarities merchandise of varying values and share composition, e.g., can be used to implement the OMC system. OMC as it relates to rarities and the RTP system could be exemplified by the following: an owner of a rarity registers and lists his or her rarity through the RTP system. The registration process for each listed rarity or entry could vary depending on the asset type, product classification, degree of vetting, security, certification, listing agent or organization, and such. The RM online merchandiser is the first convergence exchange where the seller-buyer or buyer-seller virtually actualizes one virtual environment to another virtual milieu.

The term "virtual convergence" refers to the new software ability to parallel corresponding transactional documentation between the buyer and seller or vice versa. These parallel milieus allow an investor(s) in a rarity or other asset to virtually select assets. In other words, investors could virtually tour an art gallery, classic car garage and rarity collections, for example, to view, evaluate and purchase fractional shares. In the RTP network system of the present invention, when fractional shares of rarity assets are purchased, the assets could be owned by a multitude of investors. Thus assets, if fractionalized, in preferred embodiments are stored in a safe neutral location (e.g., a warehouse), unless specific physical contractual rights are specified.

The RTP system can be exemplified by the following scenario:

The Raritymine could be exemplified by the following:

RarityBits are offered to one or more RMR of a RM—Picasso's "Dora Maar Au Chat" (1941), 1927 Bugatti Roadster, 1840 the British postal service sold the first Penny Blacks, Stradivarius "Lady Blunt" violin from 1721 . . . or any or singular rarity pooled rarity asset group.

FIG. 1 shows exemplary emergency and/or non-emergency networks and sub-networks for the integration of a dynamic wireless and wired network utilized for trading rarity assets. RarityMines 110 represents the informational database for one or more rarity assets, rarity classification, rarity sub-classification and all forms of rarity tangible and intangible assets. Rarities, as depicted here, include valuable tangible assets and can include, but are not limited to, coins, gems, fine art, rare vehicles, antiquities, antiques, time pieces, musical instruments, precision instruments, historical designs, architectural renderings and structures, and special collections, sports and entertainment memorabilia, athletic contracts, equine related sports i.e. racehorse fractional share ownership, robotic entertainments, rare books, rare documents, autographs, fine wines and spirits, recovered treasures and other man/woman-made rarities, environmental geological and archeological rarities, historical artifacts, documents and all other tangible and intangible assets (copyright, brands, trademarks etc.). Fractionalized rarity ownership as represented by 107 is referred to as RarityBits. Fractional ownership of one or more rarity assets is based on a percentage of equity, preferred or common stock or ownership units offered to more than one buyer, partnership, organization etc. Fractional shares, e.g., can be sold in a variety of investment vehicles, exchanges, (managed or self-managed) exchange-traded funds (ETFs), whether the assets are managed and registered and approved by the SEC or self-managed throughout the buy-sell trading process. Managed funds, e.g., can be sold as RarityBits 107 investments run on behalf of an investor agent subject to local and/or international trading restrictions and government market intervention policies, e.g., SEC regulations. Self-managed investments are defined for the purpose of the patent as investments whereby an individual or organization assumes all of the risk. It is understood by anyone familiar with the art, e.g., that self-managed Index ETFs while self-managed investments, generally remain subject to the rules and regulations governing Exchange Traded Funds. An investment agent is generally defined as a person who acts on behalf of another when investing, for example, here, investing in rarity fractional shares. RTP component of the invention could be networked in order to receive or send a multitude of RTP information, through any type of secure wireless connection 102 and mobile devices 108 (e.g., a smart watch, smart wearables, smart phones, smart tablets etc.). FIG. 1 spokes 111, 112, 113, 114, 115, and other spokes represent various rarity investment accounts which, e.g., could be comprised of a plurality of RarityBits 107. 105 depicts one or more RarityMiners which search or discover, own, sell, buy or trade rarity assets. RarityMiners, e.g., could be owners or sellers of more than one asset or RarityBit 107. In FIG. 1, 101 references RoboRarity-Trading (RRT) as previously defined in the present invention, RarityMiners 105 (e.g., buyers-sellers) can utilize a RRT data stream to dynamically inform themselves or others of opportunistic rarity investments. An RRT, e.g., can include advanced artificial intelligence algorithms configured to help forecast market trends and recommend when, how or what RarityBit 107 to buy or sell, the shares to sell or buy and even who to sell them to on the RTP system. Further, as previously described, the Online Merchandising Convergence (OMC) 104 includes a virtual 3D trading mart or forum where both buyers and sellers can virtually exchange images after or before trading occurs.

In addition, the trading platform 102 between buyers and sellers and RarityBits 107 through a plurality of servers, backend servers and sub-servers (depicted at 109), the application programming interfaces (API) cloud network and backend servers, etc. which account for any RTP transaction, certifies any RTP transaction managed in conjunction with a 3rd party through the secure developer's tool kit or through its own mechanism. This includes, but is not limited to, infrared devices which could transmit and disseminate RTP information through the network for all types of trading purposes. In certain embodiments, the network can be composed of wired means, as well as wireless, in order to send and receive alerts and other information needs of the RTP system's RMS. Additionally, the above components are included in accordance with various embodiments of the present invention.

Figure 2:
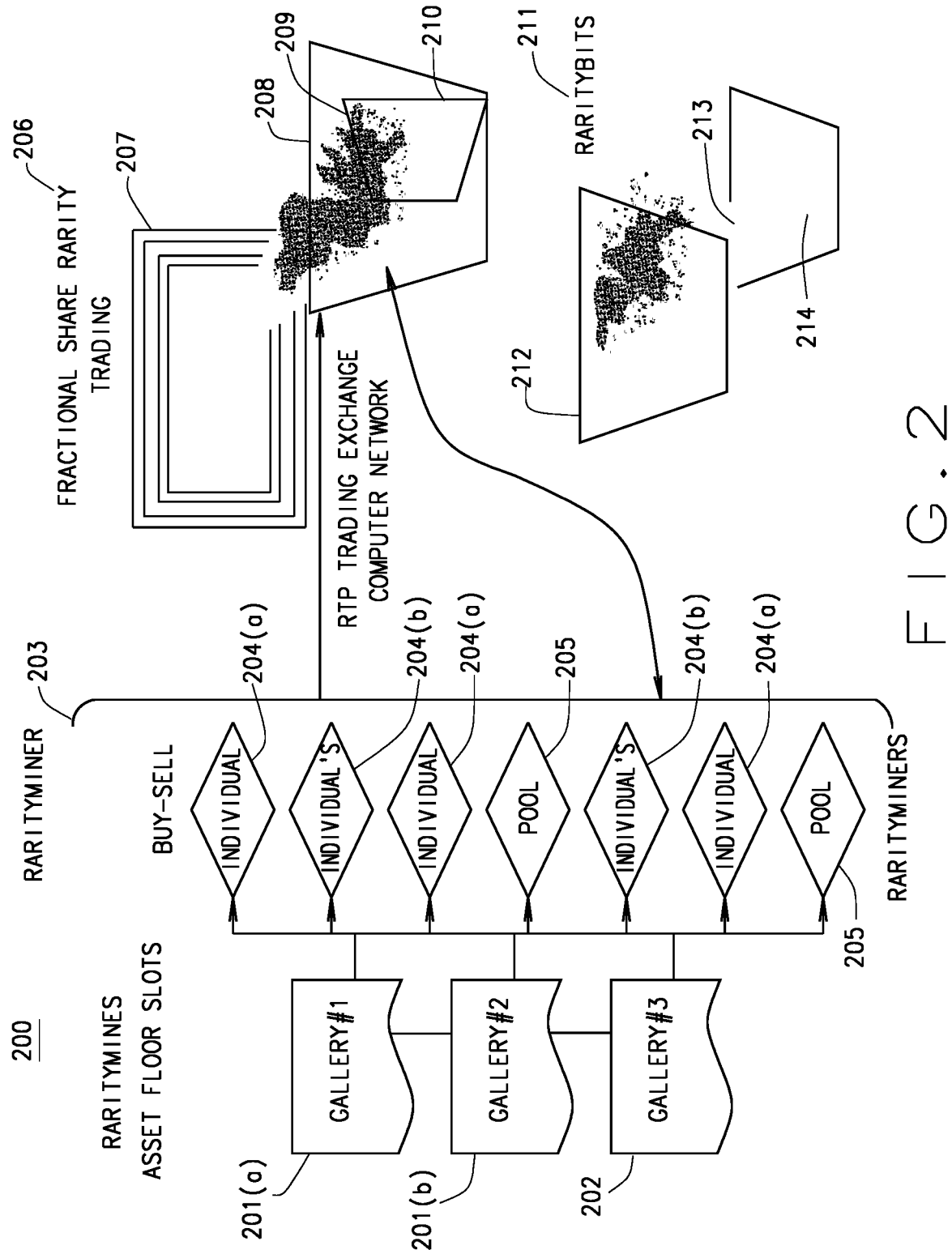
FIG. 2 is a schematic depiction of an embodiment of an Online Merchandising Convergence (OMC) in accordance with the present invention.

FIG. 2 shows a schematic representation of a RarityMiner 203, which includes, e.g., all buyers and sellers of rarity assets, including individual owner/seller assets 204 (*a*), more than one individual owner/seller 204 (*b*), or a pool of owner/buyers 205. Pooled assets are defined as themed rarity assets or multiple rarity assets. Rarity asset classes and subclasses can be an asset component to the pool of assets. In like manner, RarityMines 201 (*a*), 201 (*b*), and 202, represent the asset themselves rather than the trader of assets as previously described. A partial rarity asset holding 214 which is just offered or mostly unsold as it related to fractional shares (depicted at 207) represents a fine art piece being offered by the RarityMiner seller to Rarity buyers. An example of a rarity asset or pool of assets 212 which are largely fulfilled (purchased) is also shown. These RarityBits 211 represent fractional shares 206 of any rarity asset. Diversified rarity funds 208, 209, 210 can include many classifications of rarities sold through the RTP Trading Exchange Computer Network. In addition, RarityBits when sold through the Internet, e.g., can also include a paid virtual space referred to as Asset Floor Slots which will be again referenced and described elsewhere herein. In embodiments of the invention, fractional shares are accounted for and their purchase or sale dynamically logged and posted in real-time or near-time in similar fashion to any stock or trading exchange. In addition, a rarity asset could be fully purchased by a managed fund or a self-managed fund and resold or held. In addition, the above components are included in accordance with various embodiments of the present invention.

Figure 3:
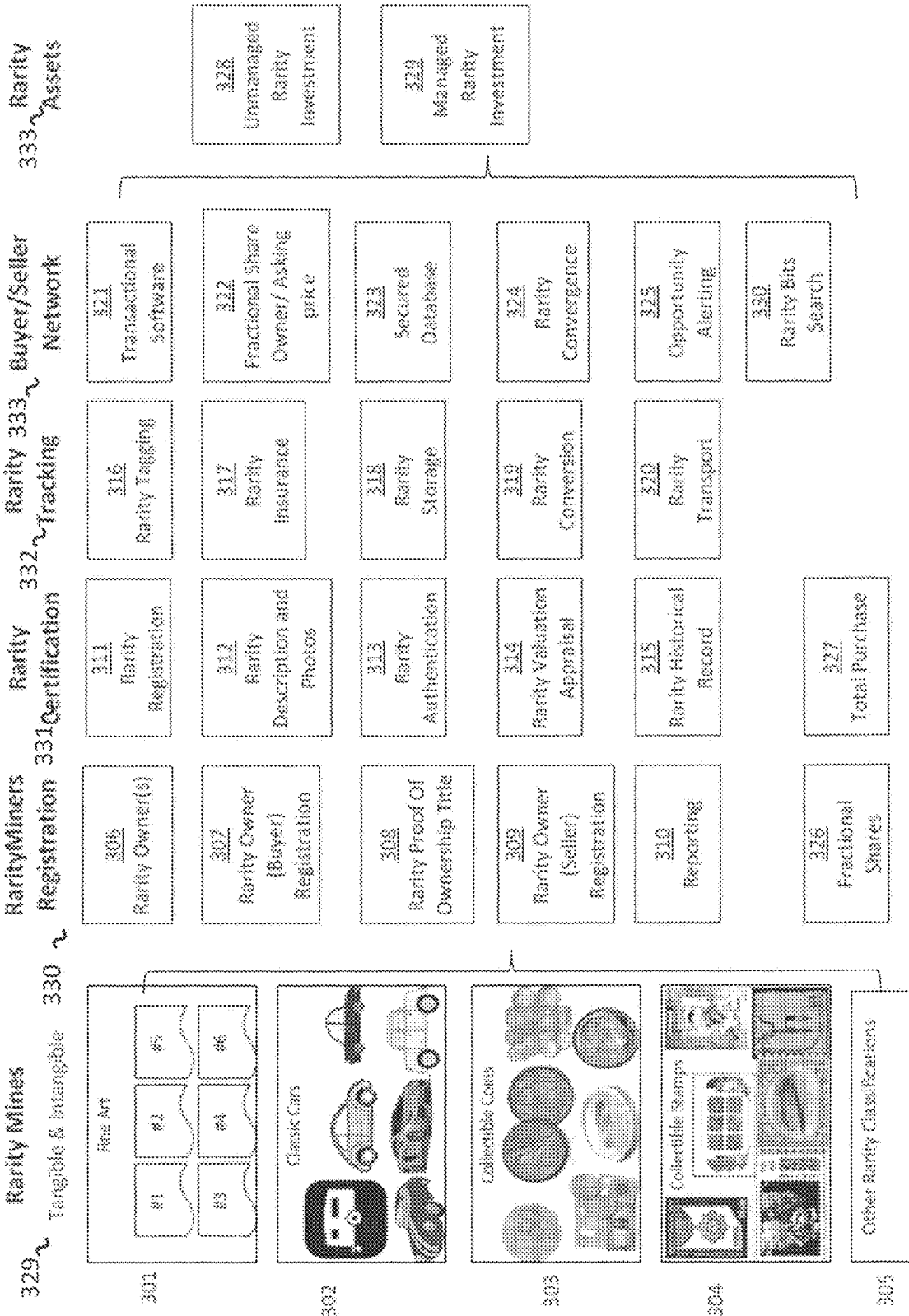
FIG. 3 is a schematic depiction showing a block diagram exemplifying singular or pooled rarity assets referred to as a RarityMine in accordance with embodiments of the present invention.

FIG. 3 is a schematic providing an example of the Rarity Trading Platform (RTP) illustrating this aspect of the invention. In FIG. 3, Rarityminers 330 exemplifies the registration process of both buyer and sellers of rarities. One exemplary scenario includes the buyer Mike (a rarity owner), e.g., 306 registering his proof of ownership 307, and the buyer registering his or herself 307. Mike enters information as to the proof of ownership to the RTP database, including title, if needed 308. 331 represents an example of rarity certification and provenance informational database including entering (reregistering) the asset to the RTP Raritymine 311, entering high-definition photos, video, 3D animation and/or holograms of the asset. One or more evidentiary components regarding the former description can be used for managed and self-managed rarity assets. 313, 314 and 315 exemplify additional information regarding rarity certification and authenticity. Rarity Tracking also referred to as Raritysystems, tagging 316, insurance 317, storage 318, OMC 318, transportation of rarities 320 to a 3rd party verification warehouse when sold in fractional shares 326, or buyer and seller when sold entirely (100%) 327. RMS 329 can include one or more rarity assets, including, but not limited to, fine arts, classic cars, collectible coins, collectible stamps etc. 301-305. The buyer-seller network includes, for example (as components) transactional software 321, Fractional Share (owner/ask price) 322, a secured database 323, rarity convergence 324, investment opportunities alerting 325, and a robust informational search engine 320. In addition, the RTP System, in certain embodiments, is configured for both self-managed funds 328, managed funds 329, or a composite of both, if allowed by governing bodies.

Figure 4:
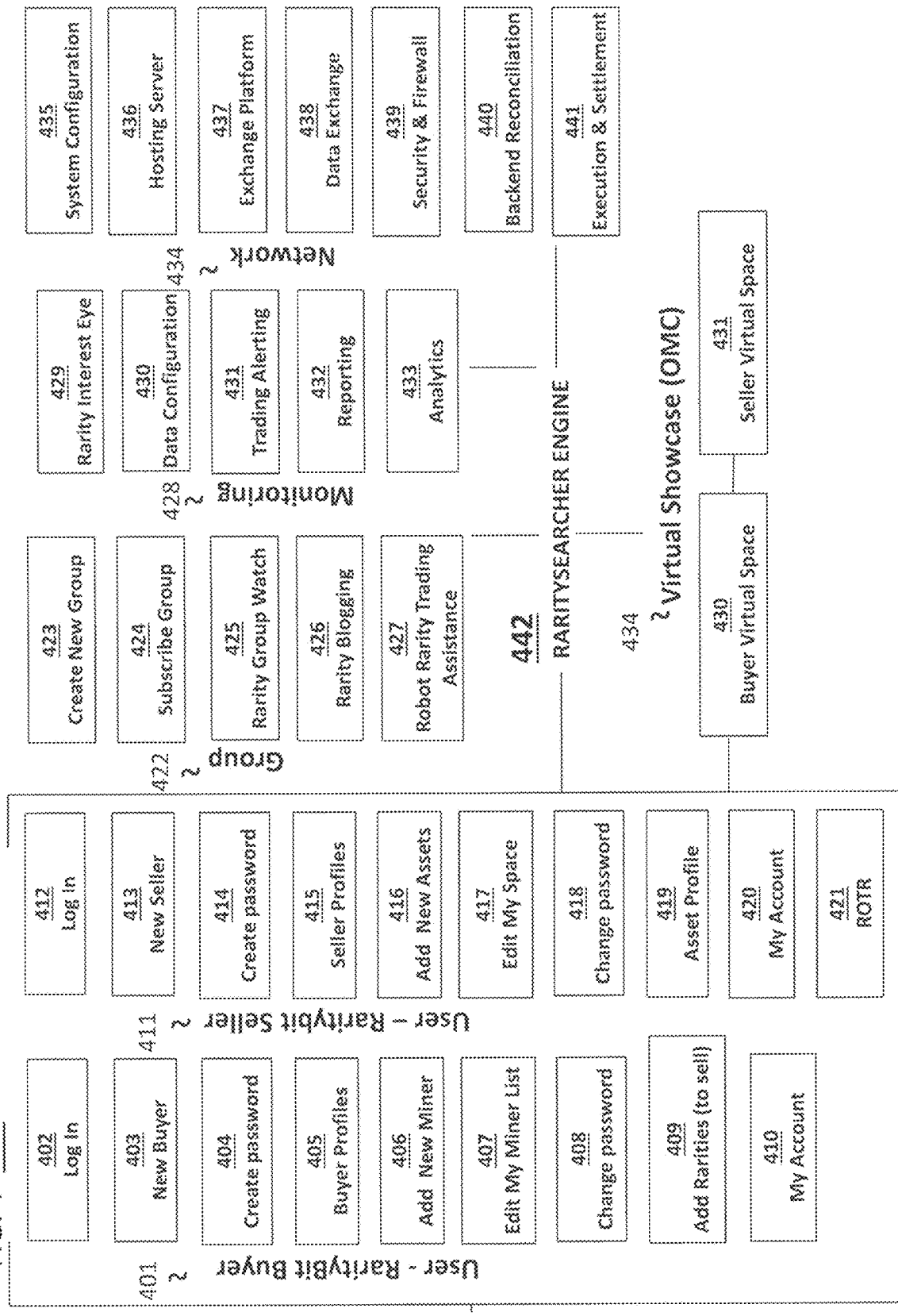
FIG. 4 is a schematic depiction of a block diagram representation of a RarityMiners Tool Kit architecture for buyers and sellers of rarities in accordance with embodiments of the present invention.

FIG. 4 provides a schematic representation of an embodiment of the RarityMiners Tool Kit. In this embodiment, the tool kit includes a robust software component, API cloud information (backend server), mobile applications, servers, sub-servers, networks, secure database(s) to store User RarityBit-Buyer information 401, including but not limited to 402-410; User-Rarity Bit Seller information 411, including but not limited to, 412-421; group junction 422 described by a social rarity buyer-seller trading exchange 421-427; monitoring 428 as represented by 429-433; and network 434 as represented by 435-441. In addition, as depicted in this embodiment, a robust rarity search engine can be in place to seek global rarity information, link buyers and seller and exchange information and artificial intelligence-Robo-Trading data stream information and suggestions as previously described. In addition, a Virtual Showcase (OMC) 434, further described in FIG. 9 and FIG. 10, Buyer Virtual Space 430 and Seller Virtual Space 431 is included.

Figure 5:
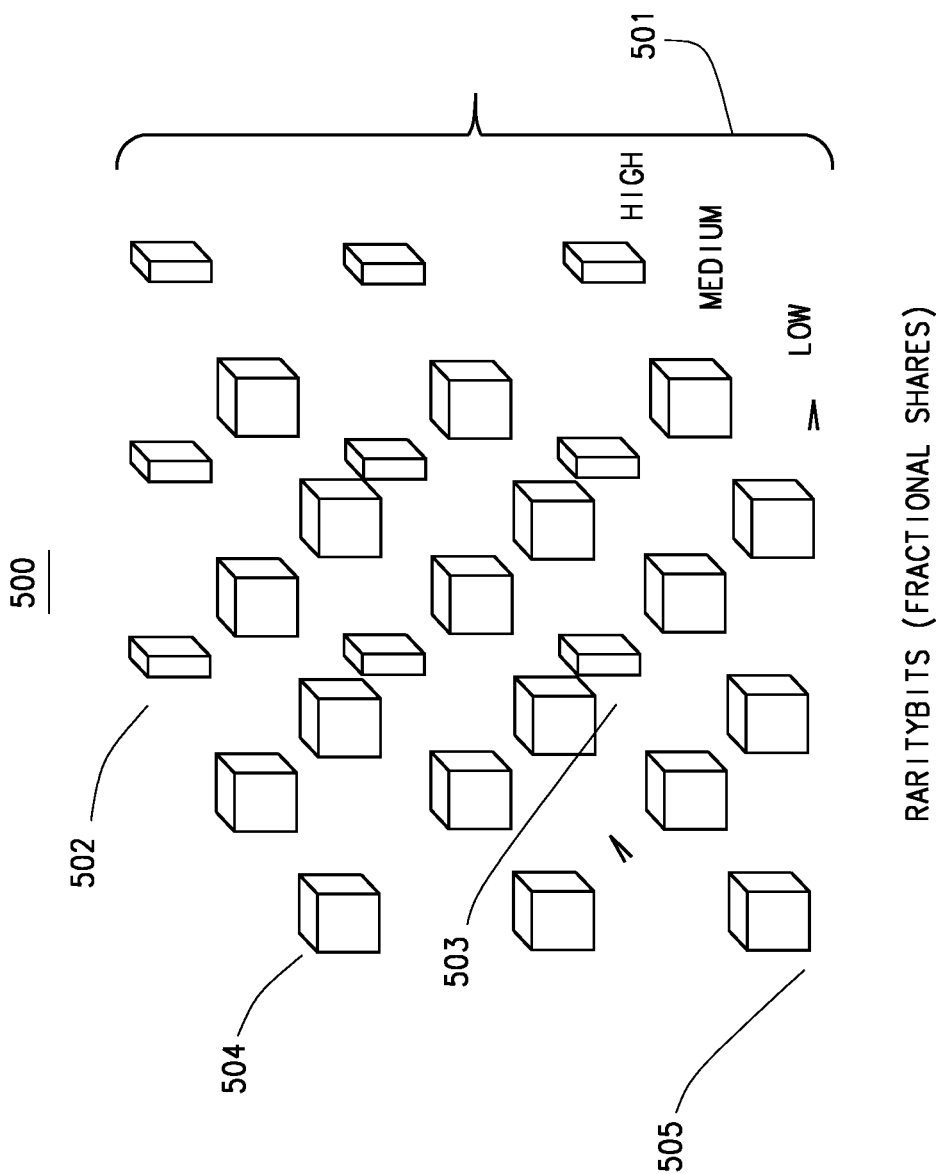
FIG. 5 is a schematic depiction showing an example of RarityBits units (fractional shares) as it relates to market liquidity market and volume in accordance with embodiments of the present invention.

FIG. 5 shows a representation of RarityBits 500 of various rarity asset(s). 501 shows degrees of liquidity between asset Y axis, asset classes and subclasses of rarity assets 505, and represents the depth of the marketplace on the X axis, where asset depth can include the differential of local rarity demand versus regional rarity demand versus global rarity demand, analytics, risks, beta volatility, forecasting, net asset values (NAVs) for one or more rarities, all analytics and graphical comparatives, trend analysis, etc. 502 exemplifies one asset with high liquidity and low market depth, for example, 504 depicts another asset (darker tone) and 503 yet another asset. This representation in other embodiments represent a RTP system standard which relies on market driven valuations rather than the current model of stagnate rarity appraisals. In alternative embodiments, certified appraisals by experts could be the prelude of marketplace valuations when opened to a larger group of buyers.

Figure 6:
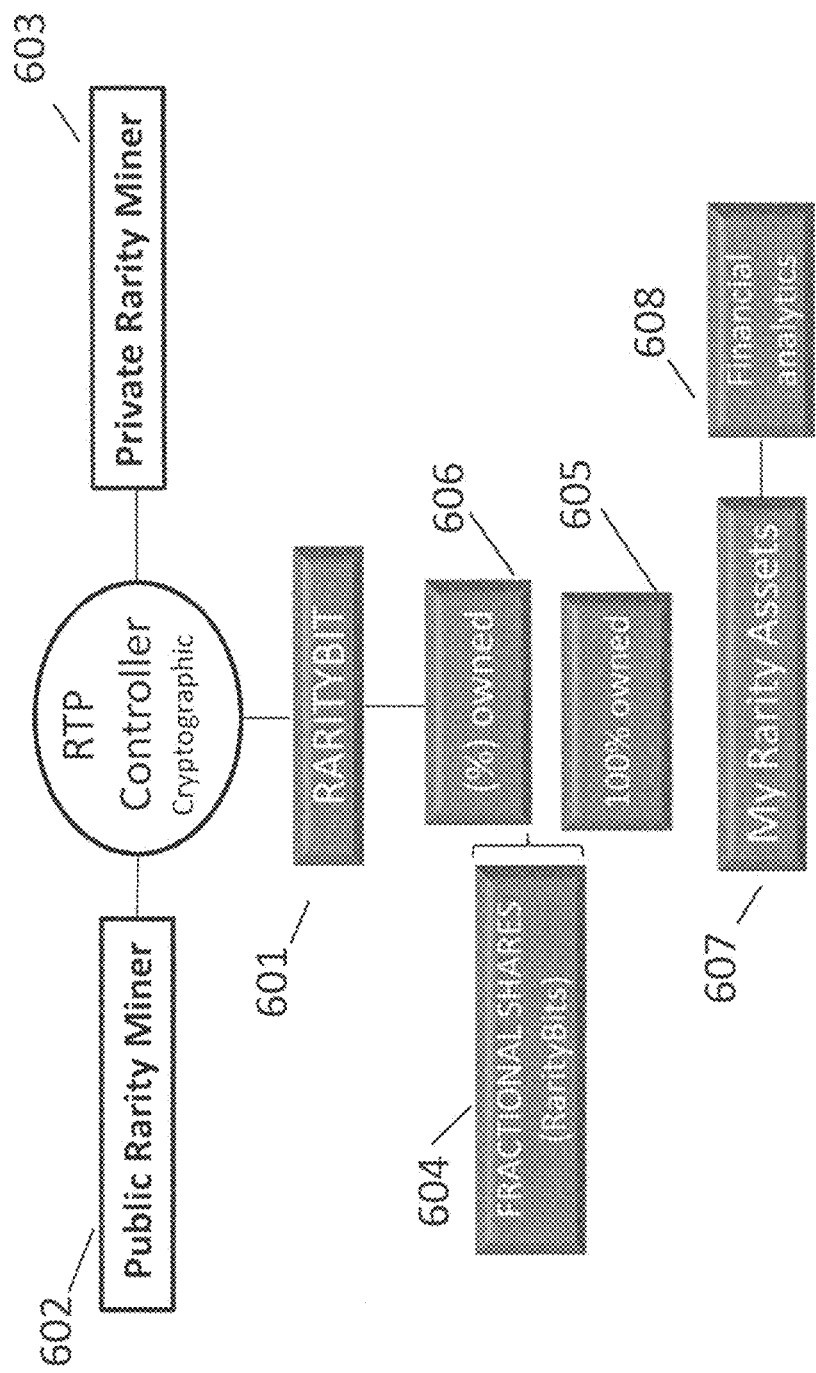
FIG. 6 is a schematic depiction which shows a block diagram exemplifying a component of the RTP regarding private and public user based rarity trading options in accordance with embodiments of the present invention.

FIG. 6 represents an embodiment including a Rarity Trading Platform and cryptographic controller which can delineate a buyer's or seller's request to have his or her information and transactions help privately 603 or held publicly 602. In the illustrated embodiment, the buyer could opt for a private transaction of shares (RarityBits 601) or a public transaction. Fractional share 604 could be held by one or more investors 606 or be fully owned 605. My Rarity Assets as shown at 607 in this embodiment, can be viewed by others in a peer to peer social network along with the SKU's financial analytics, or blocked from outside viewers. The RTP system is flexible and in various embodiments can conform to the users and to requests.

Figure 7:
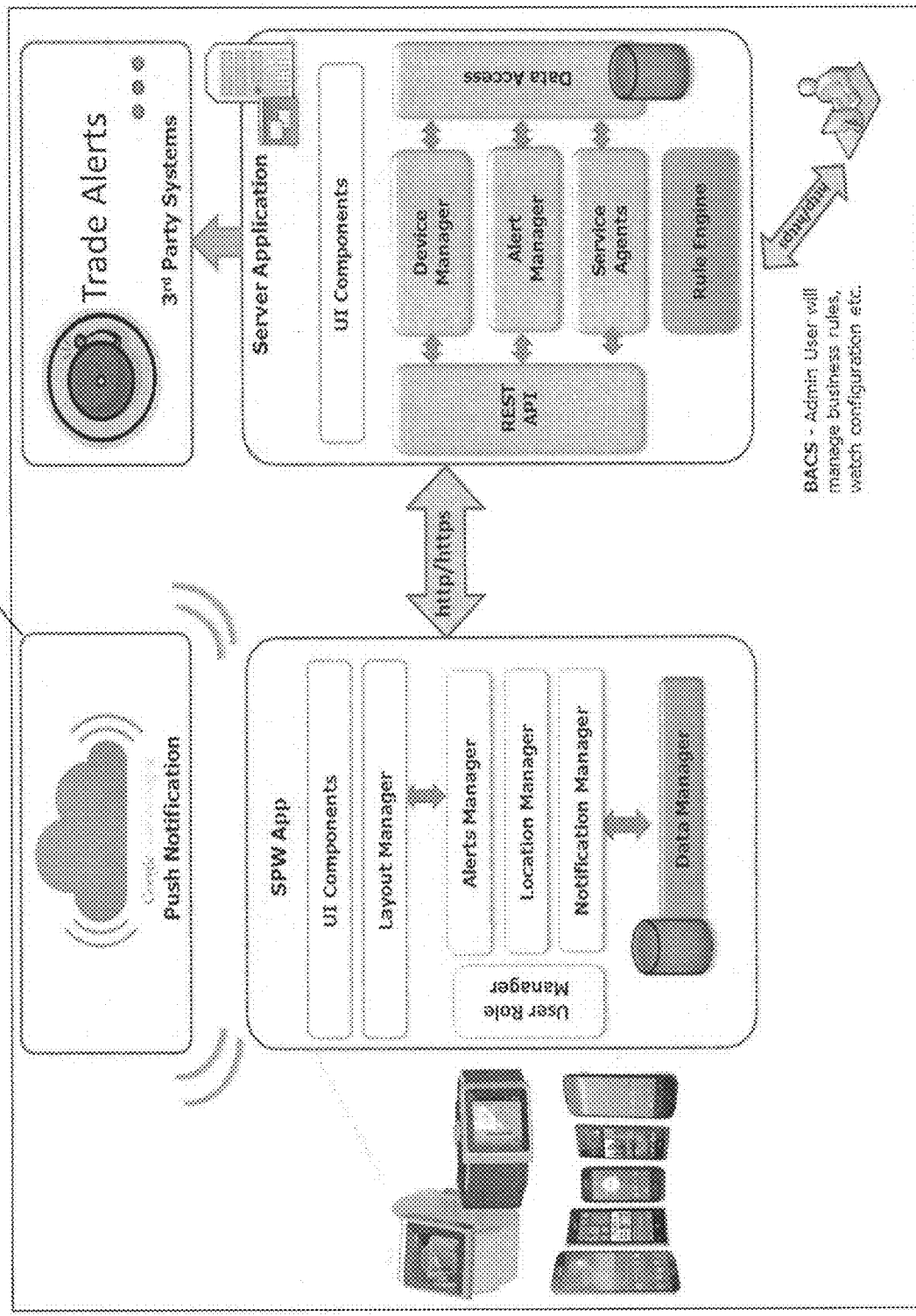
FIG. 7 is a schematic depiction of a mobile Rarity Trading Platform software configuration in accordance with embodiments of the present invention.

FIG. 7 depicts an example of a mobile trading software program and trade alert application according to an aspect of the invention. This software RTP mobile platform could provide trading tools for rarity transaction notifications and financial information through push technologies to a plurality of users, or information regarding any rarity asset. Mobile devices can include any smartphone and smartphone platform and smartphone application compatible with the RTP system. In addition, trade alerts programmed by users in setup and registration could inform buyers and sellers of both available buying and selling opportunities.

Figure 8:
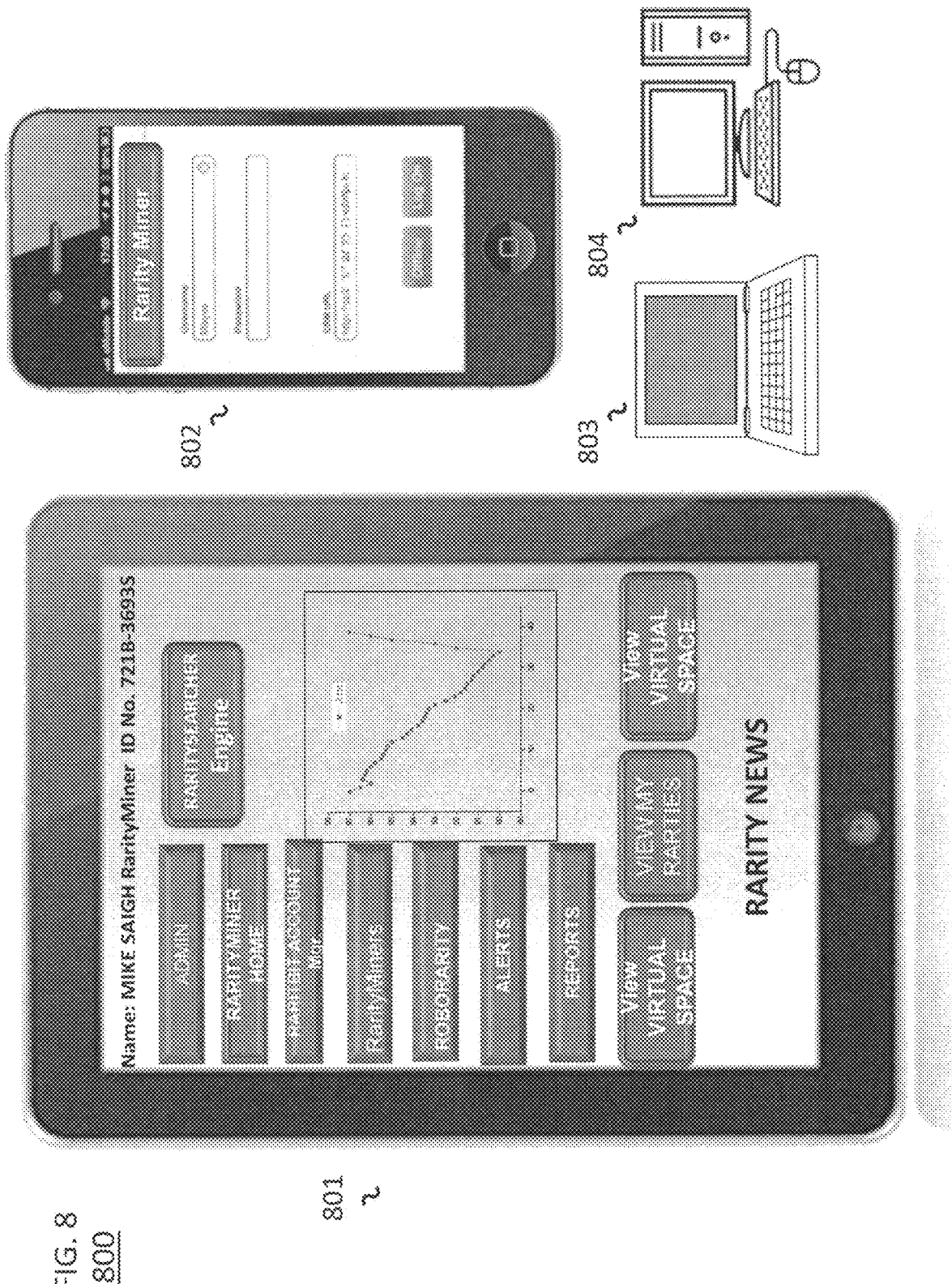
FIG. 8 is a schematic depiction of RarityMiner mobile hardware devices and software trading applications in accordance with embodiments of the present invention.

FIG. 8 exemplifies a mobile user's ID and availability to use the RTP mobile app 801 for administration purposes, registration, home page, Rarityminer family or friends, Robo-trading, alerts, reports, analytics, and such. In addition, users will be able to price each current asset, see bid and ask prices or offers, view the virtual home rarity space and seller (gallery) virtual space (slots). In addition, users could access all information on PC applications as represented 803 and 804. 802 depicts an example of an initial sign in and user ID entry. In certain embodiments, bio identifiers can also be used to identify both sellers and buyers. In addition, the mobile application can be customized for both buyers of assets and sellers of assets, asset managers or any appropriate 3rd party.

Figure 9:
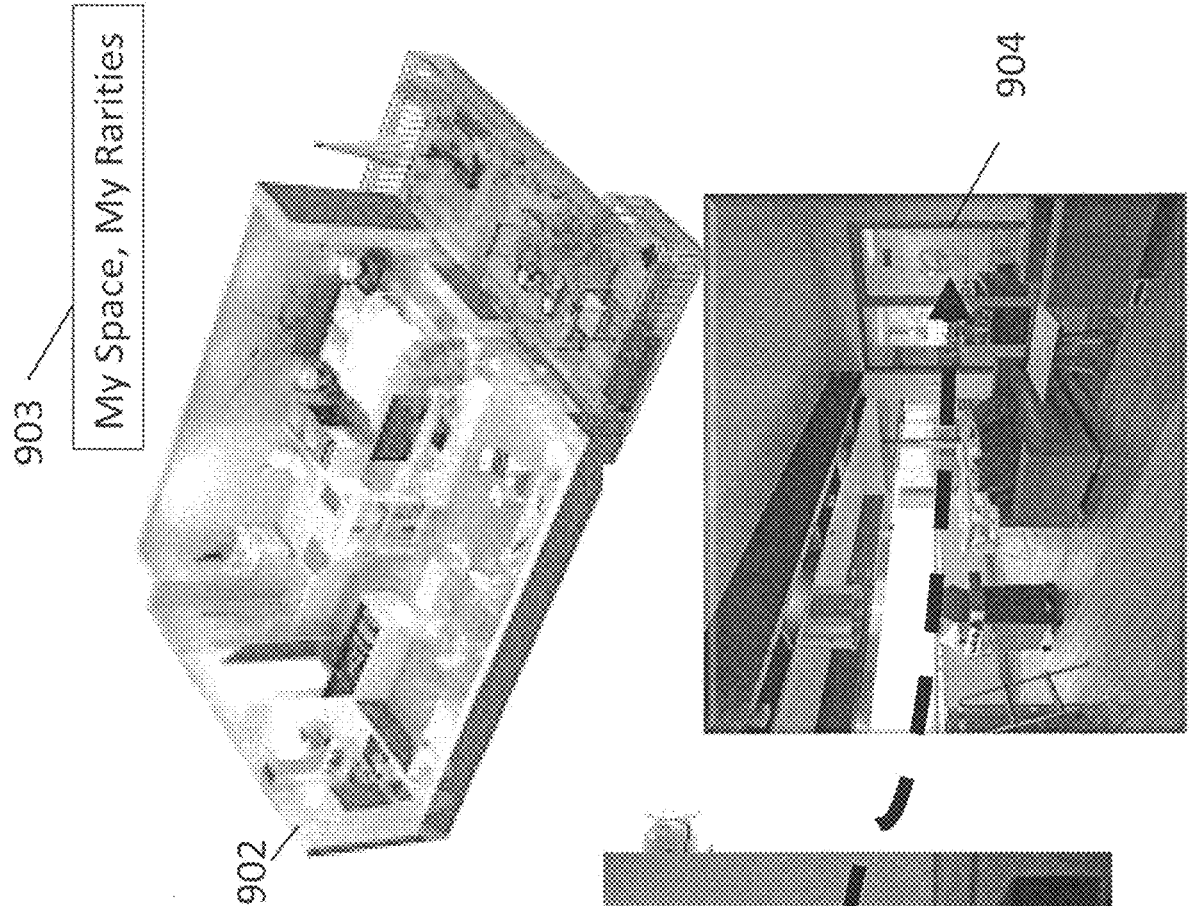
FIG. 9 is an illustrative depiction exemplifying an Online Merchandising Convergence (OMC) from buyers and sellers of fine art in accordance with embodiments of the present invention.

FIG. 9 exemplifies an asset class of fine art. Rarities can include all asset types other than the fine art example. The Online Merchandising Convergence system embodiment allows 2D, 3D, or holographic images, of increasingly fine detail or additional graduated enhancements, to be transferred from a gallery or sellers' virtual spaces, as previously described, to a buyers' virtual space, or vice versa. Buyers and sellers can set up their virtual space from the RTP-OMC software program as exemplified by 902. In various embodiments, information can be exchanged from a plurality of buyers and sellers of rarities, as exemplified 903. In addition, in yet another embodiment, images could be transferred from the seller's virtual space 901 (showcase) to the buyer's virtual space 904. In addition, images, video, asset information as configured depending on requested, or customized, embodiments, can be lifted from one space to another when, after the seller extends the rights to the RarityMiner(s) as exemplified, (see 903). In addition, buyers can transfer the asset back to the seller's virtual space when reselling the asset (RarityBit). Thus, RarityBits can be wholly owned or fractionally owned, but their virtual images can be readily transferred and shared among fractional owners with appropriate benefits derived.

Figure 10:
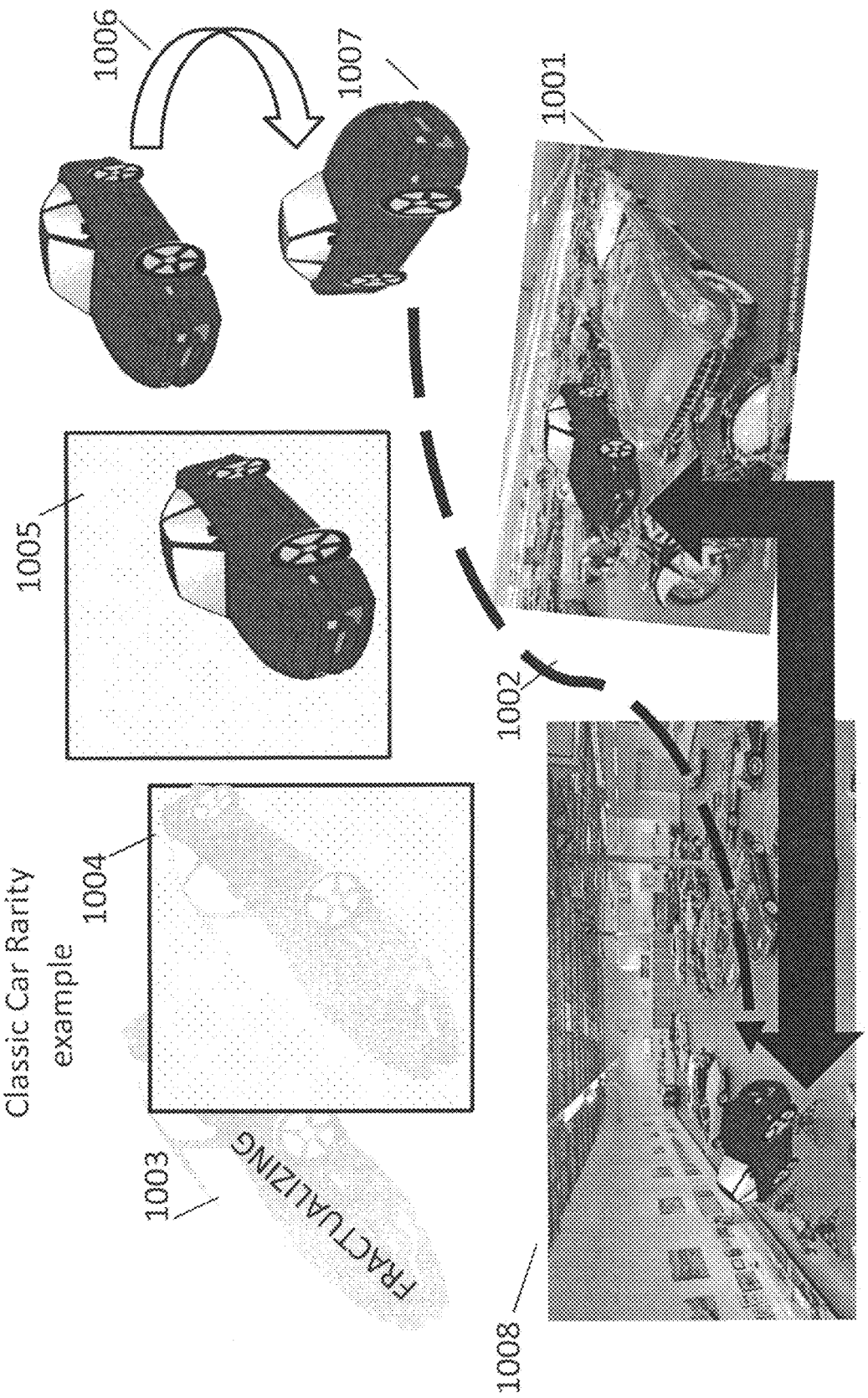
FIG. 10 is an illustrative depiction exemplifying another example of an OMC showing a 3D visualization between buyers and sellers of classic cars in accordance with embodiments of the present invention.

FIG. 10 exemplifies an asset class of classic motor vehicles. The Online Merchandising Convergence system embodiment allows 2D, 3D, holographic images, and such to be transferred from a car gallery, in this case, or sellers' virtual spaces as previously described to a buyers' virtual space or vice versa. Buyers and sellers can set up their virtual space from the RTP-OMC software program as exemplified by 1002. In addition, in yet another embodiment, images can be transferred 1002 from the seller's virtual space 1001 (showcase) to the buyer's virtual space 1008. In addition, images, video, enhancements and asset information can be lifted from one space to another after the seller extends the rights to the RarityMiner(s), as exemplified 1004-1007. In addition, buyers can transfer the asset back to the seller's virtual space when reselling the asset (RarityBit). RarityBits can be wholly owned or fractionally owned 1003.

In another embodiment, the mobile/smart device interfaces a multitude which identify one or more remotely by smart accessories, smart wearables and other devices. The unit, in various embodiments, can be remotely turned off, require a password, detect a different metabolism and other means of shutting off the device. In addition, the device, when detecting another unauthorized user, could automatically notify transactions. Rarities could track the device and/or remotely turn the video and audio and other enriched data. This data in could be streamed to secure mobile devices. Rarities could be located in any "campus". "Campus" can be defined by any geographic territory. In addition, inside unmanned equipment could be equipped with surveillance cameras, audio, and other technologies including but not limited to automated wireless guidance systems. In certain embodiments, the RTP information is data streamed from robotic drones and integrated with participants' mobile devices.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

It should be understood that the steps of any exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, when used, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of this invention may be made by those skilled in the art without departing from the scope of the invention as expressed in the claims.

What is claimed is:

1. A virtual merchandising mart comprising a simulated trading center, wherein a virtual three-dimensional depiction of one or more rarity assets included in a raritymine are configured for visualization by sellers and buyers of raritybits in the raritymine.

2. The virtual merchandising mart of claim 1 further comprising one or more Internet showcases wherein an owner of a raritybit can virtually display a three-dimensional image of the one or more rarity assets for which the raritybit represents an ownership interest.

3. The virtual online merchandising mart of claim 2 wherein the one or more Internet showcases are configured to be customizable by the owner of the raritybit to facilitate its presentation.

4. The virtual online merchandising mart of claim 1 wherein the mart is connected to a controller with the capacity to configure the mart based on one or more of optimization of buyer-seller traffic, scale, type of asset, rarity value, rarity size, asset popularity, asset demand, information complexity, historical references, search engine, number of fractional share buyers, or analytics.

5. The virtual merchandising mart of claim 1 wherein the virtual three-dimensional depiction further comprises a holographic image.

6. The virtual merchandising mart of claim 1 wherein the virtual three-dimensional depiction further comprises one or more of action, sound, smell, taste, touch or a combination of two or more of these or other sensory depictions.

7. The virtual merchandising mart of claim 1 wherein the virtual three-dimensional depiction further comprises action-oriented depictions of one or more of the rarity assets.

8. The virtual merchandising mart of claim 1 wherein the virtual merchandising mart is a depiction of a fine arts gallery or other artistic showcase.

9. The virtual merchandising mart of claim 1 wherein the virtual merchandising mart is a garage or other showcase of collectible vehicles.

10. The virtual merchandising mart of claim 1 wherein the virtual merchandising mart is an auction house or other showcase of stamps, coins or similar collectibles.

11. The virtual merchandising mart of claim 1 further comprising a robo-rarity trading support system comprising a smart data compiler configured to data stream information for use by the sellers and buyers of raritybits in the raritymine to facilitate operations of the virtual merchandising mart.

12. The virtual merchandising mart of claim 5 wherein the depiction comprises a virtual three-dimensional holographic image, action and touch.

13. The virtual merchandising mart of claim 12 wherein the virtual merchandising mart is a showcase of collectible vehicles.

14. The virtual merchandising mart of claim 1 further comprising a rarities trading exchange toolkit comprising a software control system configured to authenticate the one or more rarity assets shown in the virtual three-dimensional depiction.

15. The virtual merchandising mart of claim 1 further comprising a rarities trading exchange toolkit comprising a software control system configured to one or more of tagging, tracking, or securing rarity assets depicted in the online merchandise convergence.

16. The virtual merchandising mart of claim 4 wherein the controller has the capacity to configure the mart based on optimization of buyer-seller traffic.

* * * * *